US012147182B2

(12) United States Patent
Tanaka

(10) Patent No.: US 12,147,182 B2
(45) Date of Patent: Nov. 19, 2024

(54) IMAGE FORMING APPARATUS

(71) Applicant: CANON KABUSHIKI KAISHA, Tokyo (JP)

(72) Inventor: Sumito Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/135,930

(22) Filed: Apr. 18, 2023

(65) Prior Publication Data

US 2023/0251597 A1 Aug. 10, 2023

Related U.S. Application Data

(63) Continuation of application No. 17/203,343, filed on Mar. 16, 2021, now Pat. No. 11,656,566.

(30) Foreign Application Priority Data

Mar. 19, 2020 (JP) ................................ 2020-049103

(51) Int. Cl.
*G03G 15/00* (2006.01)
*G03G 15/04* (2006.01)

(52) U.S. Cl.
CPC ... *G03G 15/5016* (2013.01); *G03G 15/04036* (2013.01); *G03G 15/5041* (2013.01); *G03G 15/5058* (2013.01); *G03G 15/5062* (2013.01); *G03G 2215/00067* (2013.01)

(58) Field of Classification Search
CPC ............. G03G 15/5016; G03G 15/502; G03G 15/5062; G03G 2215/00067
See application file for complete search history.

(56) References Cited

U.S. PATENT DOCUMENTS 10,498,929 B2 12/2019 Tomii
11,656,566 B2 * 5/2023 Tanaka ............... G03G 15/5016 399/49
2005/0141907 A1 6/2005 Izumikawa et al.
2006/0028696 A1 2/2006 Michile et al.
(Continued)

FOREIGN PATENT DOCUMENTS

JP 2005-051559 A 2/2005
JP 2019-092034 A 6/2019
JP 2019-135530 A 8/2019

OTHER PUBLICATIONS

Office Action dated Nov. 7, 2023, in Japanese Patent Application No. 2020-049103.
(Continued)

*Primary Examiner* — Carla J Therrien
(74) *Attorney, Agent, or Firm* — Venable LLP

(57) ABSTRACT

An image forming apparatus includes a platen on which an original is to be placed, a feeder configured to feed an original placed on a tray, a sensor configured to detect a sheet on the tray, a lamp provided to the feeder, a reader configured to read the original placed on the platen and to read the original conveyed by the feeder, an image forming unit configured to form an image on a sheet, and a controller. The controller is configured to control the image forming unit to form a test image on a sheet, control the reader to read the test image formed on the sheet placed on the platen, control a density of the image to be formed by the image forming unit based on a reading result of the test image.

19 Claims, 8 Drawing Sheets

(56) References Cited

U.S. PATENT DOCUMENTS

| | | | | |
|---|---|---|---|---|
| 2006/0171726 | A1* | 8/2006 | Noda | H04N 1/00405 399/16 |
| 2007/0285743 | A1 | 12/2007 | Hirayama | |
| 2009/0153916 | A1 | 6/2009 | Borsuk et al. | |
| 2010/0309525 | A1 | 12/2010 | Tanaka | |
| 2011/0228285 | A1* | 9/2011 | Kohara | G03G 15/502 358/1.2 |
| 2016/0162762 | A1* | 6/2016 | Maeda | H04N 1/00708 358/1.18 |
| 2017/0131671 | A1 | 5/2017 | Nishimura et al. | |
| 2019/0149700 | A1 | 5/2019 | Tomii | |
| 2020/0096927 | A1 | 3/2020 | Hosoda et al. | |
| 2020/0209796 | A1* | 7/2020 | Hidaka | G03G 15/5025 |

OTHER PUBLICATIONS

Office Action dated Feb. 6, 2024, in Japanese Patent Application No. 2020-049103.

* cited by examiner

IMAGE FORMING APPARATUS

BACKGROUND OF THE INVENTION

Field of the Invention

The present disclosure relates to an image forming apparatus having a calibration function.

Description of the Related Art

An electrophotographic image forming apparatus is configured to form an image on a sheet by an image forming process described below. First, the image forming apparatus uniformly charges a surface of a photosensitive member. The image forming apparatus irradiates the surface of the photosensitive member whose surface is uniformly charged with a laser beam based on an image signal, to thereby form an electrostatic latent image on the surface of the photosensitive member. The image forming apparatus develops the electrostatic latent image with toner or other developers to form a developer image on the surface of the photosensitive member. The image forming apparatus transfers and fixes this developer image to a sheet, to thereby form an image on the sheet. In a case where a color image is to be formed, the image forming apparatus individually forms developer images of a plurality of colors and transfers the developer images so that the developer images are superimposed onto the sheet, to thereby generate a color image.

An image formed by such an image forming apparatus on a sheet may vary in density or hue due to various factors. For example, the density of the image formed by the image forming apparatus changes due to a change of an environment condition such as an air temperature and humidity, and due to a temporal change of a component of the image forming apparatus. Accordingly, the image forming apparatus executes calibration for controlling the density of the image to a target density. In the calibration, there is used a test chart obtained by forming a test pattern for image density detection on a sheet. An image reading apparatus reads the test pattern of the test chart, to thereby obtain the image density of the test pattern. Image forming conditions such as parameters for adjusting the image density are adjusted so that this image density becomes the target density. With the image signal being corrected based on those parameters, even when the change of the environment condition or the temporal change of the component occurs, a stable density and tone characteristic is ensured. In the image forming apparatus described in US 2007/0285743 A1, an auto document feeder (ADF) is used in order to read the test chart and convey the test chart. In this manner, a work load of a user is reduced in a case where the calibration is performed.

The image reading apparatus is capable of reading the test pattern from the test chart placed on a platen, in addition to the ADF. Accordingly, the user may be not sure whether to use the ADF or the platen at the time of calibration. The present disclosure has been made in view of the above-mentioned problem, and has a primary object to provide an image forming apparatus with which the user can perform an operation at the time of calibration without confusion.

SUMMARY OF THE INVENTION

An image forming apparatus according to the present disclosure includes: a platen on which an original is to be placed; a feeder configured to feed an original placed on a tray; a sensor configured to detect a sheet on the tray; a lamp provided to the feeder; a reader configured to read the original placed on the platen and to read the original conveyed by the feeder; an image forming unit configured to form an image on a sheet; and a controller configured to: control the image forming unit to form a first test image on a sheet; control the reader to read the first test image formed on the sheet placed on the platen; control a density of the image to be formed by the image forming unit based on a reading result of the first test image; control the image forming unit to form a second test image on a sheet; control the reader to read the second test image formed on the sheet fed by the feeder; and control the density of the image to be formed by the image forming unit based on a reading result of the second test image, wherein the controller is configured to drive, in a case where the second test image is formed by the image forming unit in order to control the density, the lamp before the sheet on which the second test image is formed is detected by the sensor.

Further features of the present invention will become apparent from the following description of exemplary embodiments (with reference to the attached drawings).

DESCRIPTION OF THE EMBODIMENTS

Now, an embodiment of the present disclosure is described with reference to the drawings.

<Image Forming Apparatus>

Figure 1:
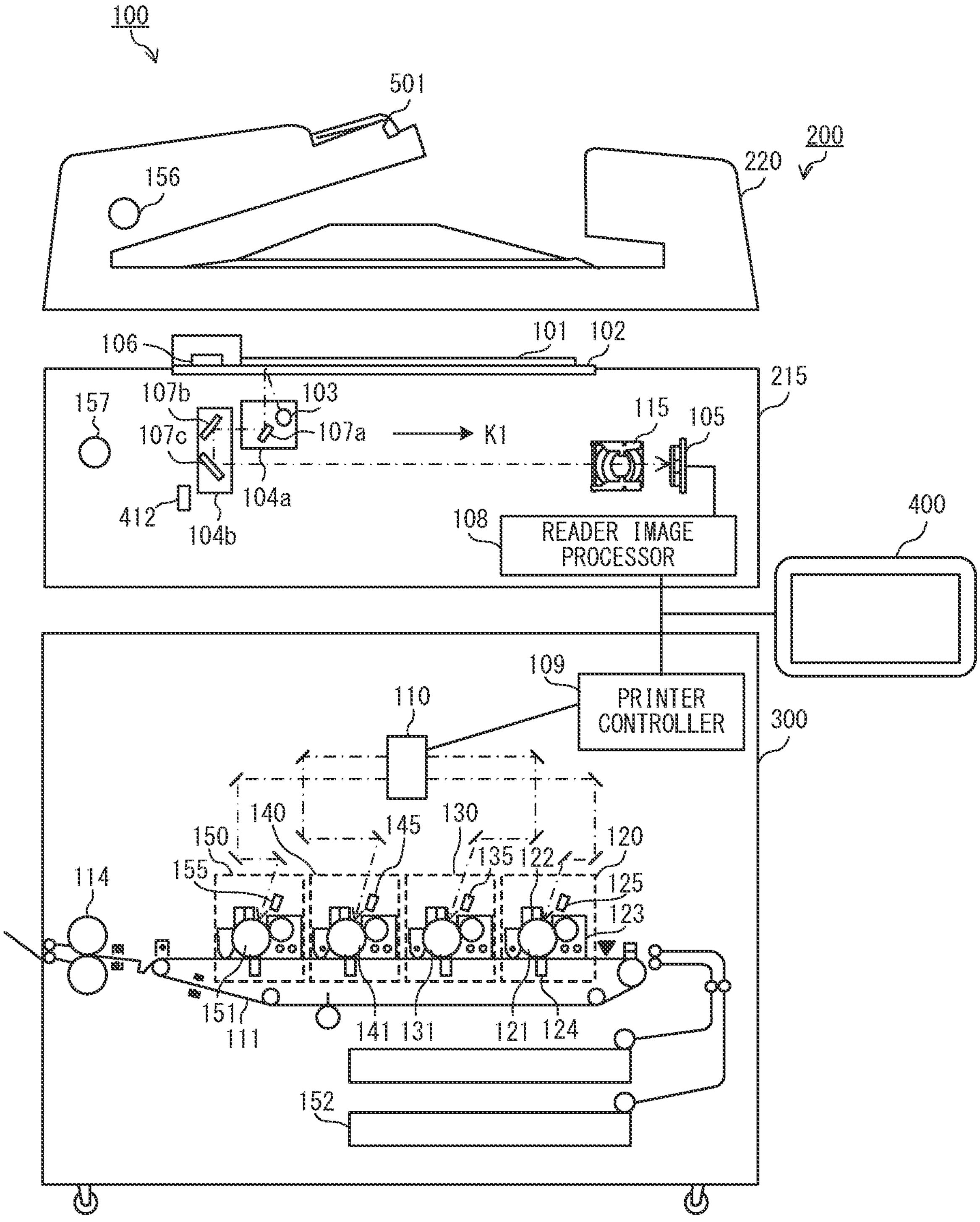
FIG. 1 is a configuration view of an image forming apparatus according to an embodiment of the present invention.

FIG. 1 is a configuration view of an image forming apparatus according to the embodiment of the present disclosure. An image forming apparatus 100 includes a reader 200, which is an image reading apparatus configured to read an image from an original (sheet), a printer 300 configured to form an image on a sheet, and an operating unit 400. The reader 200 includes a document scanner 215 and an auto document feeder (hereinafter referred to as "ADF") 220. The document scanner 215 is provided on the printer 300. The ADF 220 is provided on the document scanner 215. The reader 200 reads an image printed on an original 101, and transmits an image signal representing the read image to the printer 300. The printer 300 can perform image formation processing on the sheet based on the image signal acquired from the reader 200. The operating unit 400 is a user interface, and includes an input device and an output device.

Examples of the input device include various key buttons such as an input key, numeric keys, a start key, and a stop key, and a touch panel. The operating unit 400 is used to input user instruction information. Examples of the output device include a display and a speaker.

The reader 200 reads an original fed from an original tray 501 of the ADF 220, or the original 101 placed on a platen 102 provided on the ADF 220 side of the document scanner 215. The platen 102 is a plate-shaped transparent member made of, for example, glass. The document scanner 215 includes therein a reader image processor 108. The reader image processor 108 converts an electrical signal generated by reading the original 101 into an image signal, and transmits the image signal to the printer 300.

The document scanner 215 includes a reference white plate 106 on the platen 102. The reader 200 reads the reference white plate 106 before reading the original 101 to perform so-called "shading correction." The document scanner 215 includes a first mirror unit 104*a*, a second mirror unit 104*b*, a lens 115, and an image sensor 105. The first mirror unit 104*a* includes a light source 103. The first mirror unit 104*a* and the second mirror unit 104*b* are movable in a direction of an arrow K1. When the original 101 placed on the platen 102 is to be read, the first mirror unit 104*a* causes the light source 103 to irradiate the original 101 with light while moving in the direction of the arrow K1. Reflected light reflected by the original 101 is received by the image sensor 105. The image sensor 105 is a reading sensor which includes a plurality of photoelectric conversion elements (light receiving elements) having RGB filters, and is configured to convert the reflected light into an electrical signal for each line. A CCD sensor or a CMOS sensor can be used as the image sensor 105. The reader image processor 108 acquires the electrical signal from the image sensor 105, and converts this electrical signal into an image signal (luminance signal). Details of the document scanner 215 are described later.

The printer 300 includes therein a printer controller 109. The printer controller 109 acquires the image signal (luminance signal) from the reader image processor 108 of the document scanner 215. The printer controller 109 forms an image on the sheet based on the acquired image signal. For image formation, the printer 300 includes image forming units 120, 130, 140, and 150, an exposure device 110, a transfer belt 111, and a fixing device 114.

The image forming units 120, 130, 140, and 150 are only different in colors of images to be formed, and have similar configurations to perform similar operations. The image forming unit 120 forms a yellow (Y) image. The image forming unit 130 forms a magenta (M) image. The image forming unit 140 forms a cyan (C) image. The image forming unit 150 forms a black (K) image. A description is here given of the configuration of the image forming unit 120, and a description of the configurations of other image forming units 130, 140, and 150 is omitted.

The image forming unit 120 includes a photosensitive drum 121, a charging device 122, a developing device 123, a transfer blade 124, and a surface electrometer 125. The photosensitive drum 121 is a drum-shaped photosensitive member having a surface with a photosensitive layer. The photosensitive drum 121 rotates in a clockwise (CW) direction of FIG. 1. The charging device 122 uniformly charges the surface of the rotating photosensitive drum 121 at a predetermined potential. On the surface of the photosensitive drum 121, an electrostatic latent image is formed by scanning the charged surface with a laser beam by the exposure device 110. The developing device 123 develops the electrostatic latent image with a developer (for example, toner) of a corresponding color (in this example, yellow) to form a toner image on the surface of the photosensitive drum 121.

The exposure device 110 is controlled by the printer controller 109 to irradiate the photosensitive drum 121 with the laser beam. The exposure device 110 scans the photosensitive drum 121 in a rotation axis direction of the photosensitive drum 121. Accordingly, the rotation axis direction corresponds to a main scanning direction. The printer controller 109 modulates the laser beam, which is emitted from the exposure device 110, based on a pulse width modulation (PWM) signal that is based on the image signal.

The transfer blade 124 is provided so as to sandwich the transfer belt 111 between the transfer blade 124 and the photosensitive drum 121. The transfer belt 111 conveys a sheet fed from a sheet feeding cassette 152. The transfer blade 124 discharges electricity to transfer the toner image formed on the photosensitive drum 121 onto the sheet conveyed by the transfer belt 111. In this manner, a yellow toner image is formed on the sheet.

Similarly, a magenta toner image is formed on a photosensitive drum 131 of the image forming unit 130. A cyan toner image is formed on a photosensitive drum 141 of the image forming unit 140. A black toner image is formed on a photosensitive drum 151 of the image forming unit 150. The magenta toner image formed on the photosensitive drum 131 is transferred in superimposition onto the yellow toner image on the sheet. The cyan toner image formed on the photosensitive drum 141 is transferred in superimposition onto the yellow and magenta toner images on the sheet. The black toner image formed on the photosensitive drum 151 is transferred in superimposition onto the yellow, magenta, and cyan toner images on the sheet. The toner images of the four colors are transferred in superimposition, and thus full-color toner images are formed on the sheet.

The sheet having the full-color toner images formed thereon is conveyed to the fixing device 114 by the transfer belt 111. The fixing device 114 fixes the transferred toner images to the sheet. For example, the fixing device 114 heats and melts the toner images and applies pressure thereto to fix the toner images to the sheet. In this manner, an image is formed on the sheet. The sheet having the image formed thereon is discharged to the outside of the printer 300.

The surface electrometer 125 of the image forming unit 120, and surface electrometers 135, 145, and 155 of the image forming units 130, 140, and 150 measure surface potentials of the photosensitive drums 121, 131, 141, and 151, respectively. Contrast potentials are adjusted based on results of measurement by the surface electrometers 125, 135, 145, and 155.

In this embodiment, the ADF 220 includes a lamp 156. Further, the document scanner 215 includes a lamp 157. The ADF 220 has a sensor 504 provided thereto to detect presence or absence of a sheet on the original tray 501. The lamp 156 of the ADF 220 is turned on when a detection result obtained by the sensor 504 is a detection state representing that a sheet is placed on the original tray 501. The lamp 156 is turned off in a case where the detection result obtained by the sensor 504 is a non-detection state representing that no sheet is placed on the original tray 501. At the time of calibration, the lamp 156 or 157 is turned on when the test chart to be used for calibration is to be placed (set). The lamp 156 in this embodiment is turned on regardless of the detection result obtained by the sensor 504 at the time of calibration.

<Reader Image Processor>

Figure 2:
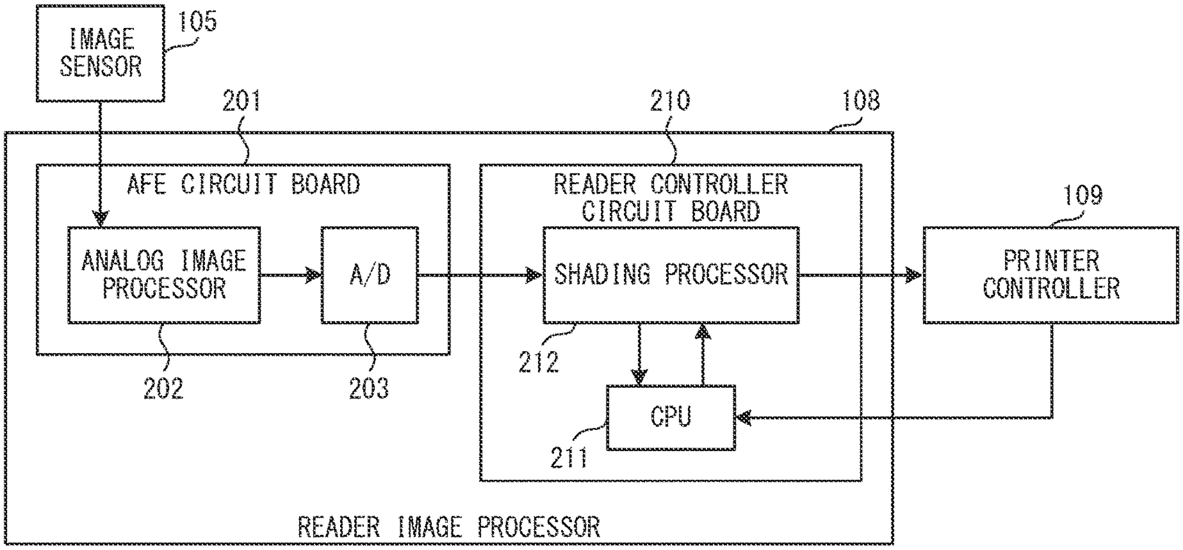
FIG. 2 is an explanatory diagram of a reader image processor.

FIG. 2 is an explanatory diagram of the reader image processor 108. The reader image processor 108 includes an analog front end (AFE) circuit board 201 and a reader controller circuit board 210. The AFE circuit board 201 includes an analog image processor 202 and an A/D converter 203. The reader controller circuit board 210 includes a shading processor 212 and a central processing unit (CPU) 211. The CPU 211 executes a predetermined computer program to control the operation of the reader 200.

The reader image processor 108 causes the AFE circuit board 201 to acquire an electrical signal output from the image sensor 105. The electrical signal is, for example, an analog signal corresponding to an amount of light received by the image sensor 105. The AFE circuit board 201 causes the analog image processor 202 to perform analog processing such as gain adjustment. The electrical signal subjected to analog processing is converted into a digital signal by the A/D converter 203.

The shading processor 212 of the reader controller circuit board 210 acquires the digital signal generated by the A/D converter 203. The shading processor 212 is controlled by the CPU 211 to perform shading correction on the digital signal, to thereby generate an image signal. The image signal is transmitted to the printer controller 109. The image signal includes pieces of luminance information of red (R), green (G), and blue (B).

<Printer Controller>

Figure 3:
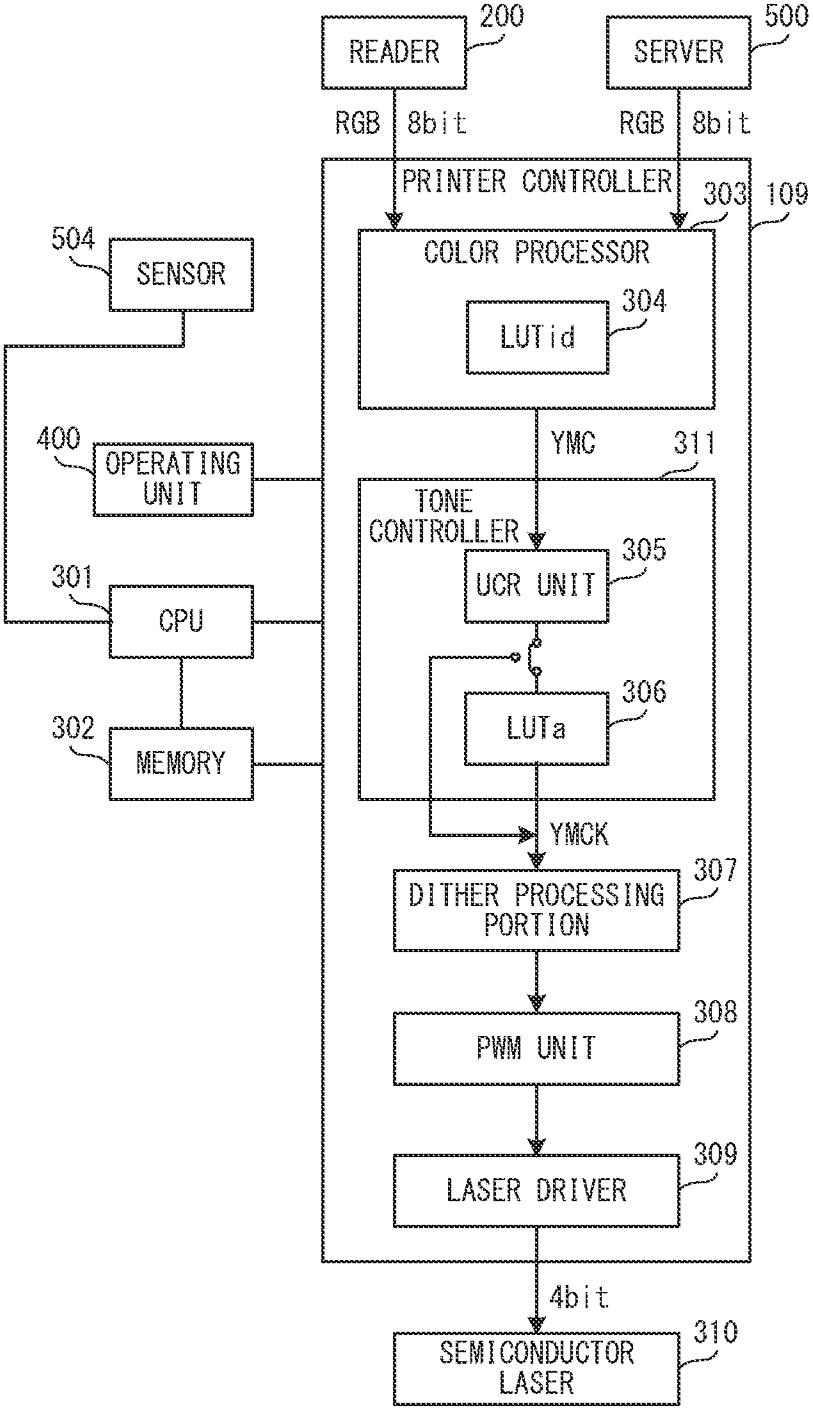
FIG. 3 is an explanatory diagram of a printer controller.

FIG. 3 is an explanatory diagram of the printer controller 109. The operation of the printer controller 109 is controlled by a CPU 301. The CPU 301 is a main controller configured to execute a control program stored in a memory 302 to control the operation of the image forming apparatus 100, to thereby perform processing of forming an image onto a sheet. The memory 302 is a read only memory (ROM) or a random access memory (RAM), and stores control programs and various types of data. The CPU 301 and the memory 302 are provided in the printer 300.

The printer controller 109 acquires the image signal from the reader 200 or a server 500, for example. The server 500 is an external apparatus which is provided separately from the printer 300, and is to be connected to the printer 300 via a local area network (LAN) or other networks. In the image signal, the number of tones of R, G, or B is represented by 8 bits. The printer controller 109 includes a color processor 303, a tone controller 311, a dither processing portion 307, a PWM unit 308, and a laser driver 309. The printer controller 109 converts respective image signals of R, G, and B into PWM signals, to thereby perform light emission control of a semiconductor laser 310 provided in the exposure device 110.

The image signals of R, G, and B are input to the color processor 303. The color processor 303 performs image processing and color processing on the input image signals so that a desired output result (image) can be obtained in a case where the printer 300 has an ideal output characteristic. The color processor 303 increases the number of tones of the image signal to 10 bits from 8 bits in order to improve the accuracy. The color processor 303 includes an LUTid 304, which is a look-up table. The LUTid 304 is a luminance-density conversion table for converting luminance information included in the image signal into density information. The color processor 303 uses the LUTid 304 to convert the luminance information of each of the image signals of R, G, and B into density information of each of yellow (Y), magenta (M), cyan (C), and black (K). The image signals including the density information of Y, M, C, and K are input to the tone controller 311.

The tone controller 311 includes an under color removal (UCR) unit 305 and an LUTa 306, which is a lookup table. The tone controller 311 corrects the tone of each of the image signals of Y. M. C, and K so that a desired output result (image) can be obtained in accordance with the actual output characteristic of the printer 300. The UCR unit 305 regulates the integrated value of the image signal in each pixel to limit the total sum of the image signal levels. In a case where the total sum exceeds a specified value, the UCR unit 305 performs under color removal (UCR) processing of replacing a predetermined amount of C. M, and Y image signals into K image signals, to thereby reduce the total sum of the image signal levels. The regulation of the total sum of the image signal levels is performed in order to regulate a toner laid-on level at the time of forming an image by the printer 300, to thereby optimize the operation of the printer 300. The optimization of the operation of the printer 300 in this embodiment refers to prevention of image defects and the like caused in a case where the toner laid-on level exceeds a specified value. The LUTa 306 is a 10-bit conversion table for correcting the density characteristic, and is used to change the y characteristic of the printer 300, for example. In this embodiment, as an example, the LUTa is described as an image forming condition to be adjusted by the calibration. The image signals of Y, M. C, and K subjected to tone correction are input to the dither processing portion 307.

The dither processing portion 307 performs dither processing on the 10-bit image signals of Y, M, C, and K subjected to tone correction, to thereby perform halftone processing (dither processing) of converting the respective 10-bit image signals of Y, M, C, and K into 4-bit signals. The PWM unit 308 performs pulse width modulation on the signals subjected to dither processing to generate a PWM signal corresponding to a control signal for the exposure device 110. The PWM signal is input to the laser driver 309. The laser driver 309 controls the light emission of the semiconductor laser 310 in accordance with the PWM signal.

<Document Scanner>

Figure 4:
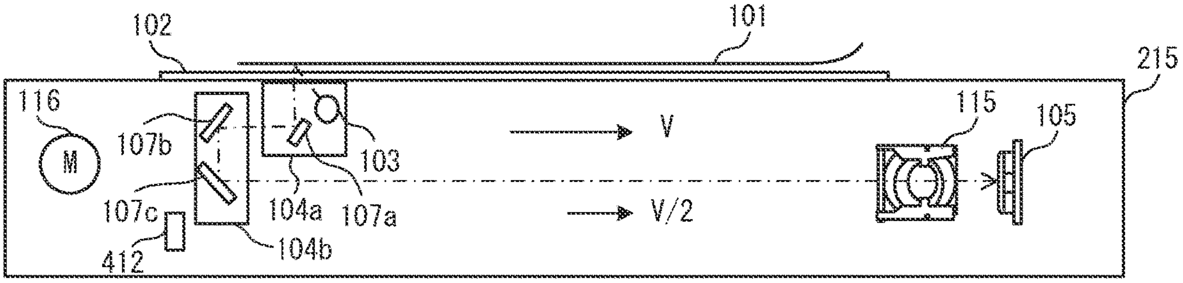
FIG. 4 is an explanatory view of a document scanner.

FIG. 4 is an explanatory view of the document scanner 215. As described above, the document scanner 215 includes, in a housing, the first mirror unit 104*a*, the second mirror unit 104*b*, the lens 115, and the image sensor 105. The document scanner 215 further includes a motor 116 and a home position sensor 412. The first mirror unit 104*a* includes the light source 103 and a first mirror 107*a*. The second mirror unit 104*b* includes a second mirror 107*b* and a third mirror 107*c*. The first mirror unit 104*a* and the second mirror unit 104*b* are movable in the direction of the arrow K1 of FIG. 1 by being driven by the motor 116. The document scanner 215 having such a configuration receives an instruction to read an image from the operating unit 400 to start its operation.

The document scanner 215 can perform image reading in accordance with a first reading mode of reading the original 101 conveyed by the ADF 220 and a second reading mode of reading the original 101 placed on the platen 102. The first reading mode is sometimes called "flow reading" and "ADF reading." The second reading mode is sometimes called "fixed reading" and "platen reading."

In either of the first reading mode and the second reading mode, the operation itself performed by the document scanner 215 to read the image is the same. When the image reading is started, the document scanner 215 causes the motor 116 to move the first mirror unit 104*a* and the second mirror unit 104*b* temporarily to a home position corresponding to a detection position of the home position sensor 412. After that, the document scanner 215 turns on the light source 103, and irradiates a reading surface (surface on which an image is printed) of the original 101 with light. The first mirror 107*a*, the second mirror 107*b*, and the third mirror 107*c* polarize reflected light (image light) of the light applied to the original 101 and guide the image light to the lens 115. The lens 115 forms an image from the image light onto a light receiving surface of the image sensor 105. The image sensor 105 photoelectrically converts the image light into an electrical signal.

As described above, the first mirror unit 104*a* and the second mirror unit 104*b* are driven by the same motor 116 to be moved in the direction of the arrow K1. With use of a movable pulley, a speed at which the second mirror unit 104*b* is moved becomes half (V/2) of a speed V at which the first mirror unit 104*a* is moved. Light is applied to the original 101 while the first mirror unit 104*a* and the second mirror unit 104*b* are moved so that the image on the entire surface of the original 101 is read.

<ADF>

Figure 5:
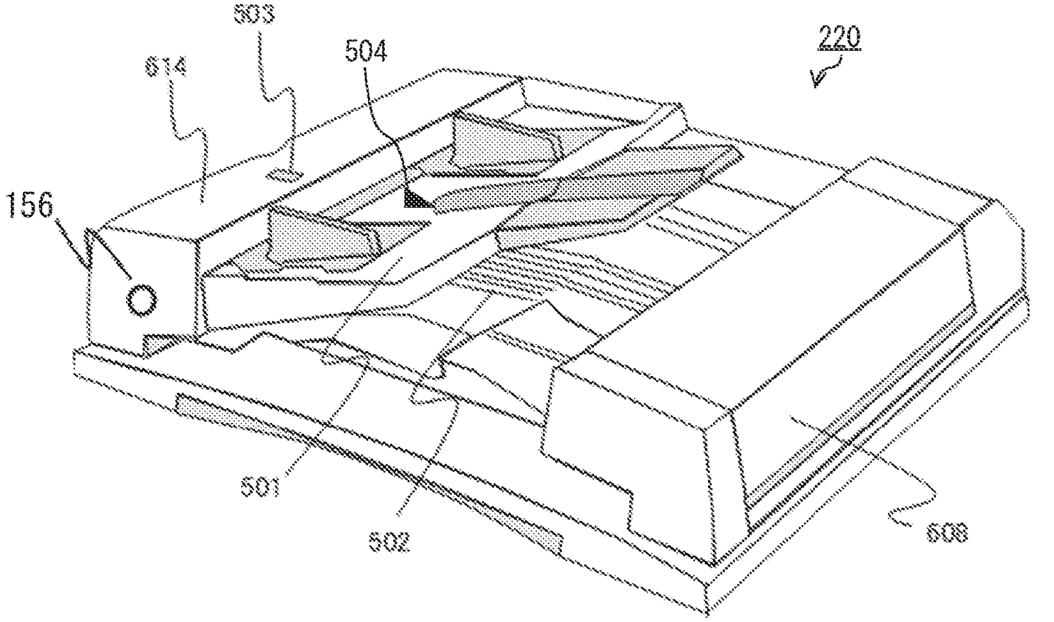
FIG. 5 is an exterior appearance perspective view of an ADF.
Figure 6:
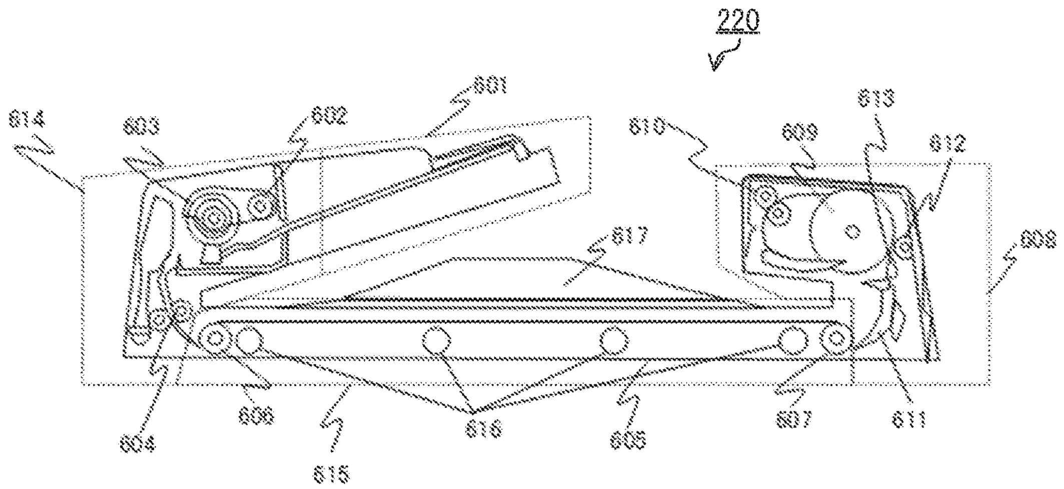
FIG. 6 is an internal configuration diagram of the ADF.

FIG. 5 is an exterior appearance perspective view of the ADF 220. FIG. 6 is an internal configuration diagram of the ADF 220. The ADF 220 includes an original stacker 601, an original feeder 614, an original conveyor 615, and an original reversing unit 608.

The original stacker 601 includes the original tray 501. On the original tray 501, one or more originals 101 can be stacked on a stacking surface thereof. The original tray 501 functions as a feeder. The original stacker 601 is provided with an original indicator 503 configured to turn on when the originals 101 are stacked on the original tray 501. Accordingly, the sensor 504 configured to detect the original placed on the original tray 501 is arranged between a pickup roller 602 and a feed roller 603 to be described later. The originals 101 stacked on the original tray 501 are conveyed one by one onto the platen 102 by the original feeder 614, pass on the platen 102, and are discharged to a discharge tray 617 by the original reversing unit 608.

In the original feeder 614, the pickup roller 602, the feed roller 603, and a registration roller pair 604 are provided along a conveying path of the originals 101. The pickup roller 602 is a roller that is rotatable and vertically movable. At the time of feeding the originals 101, the pickup roller 602 is lowered on an uppermost original of an original bundle stacked on the original tray 501 to be brought into contact with this original. At this time, a middle plate of the original tray 501 on which the original bundle is placed is raised to press the original bundle toward the feed roller 603. After the pickup roller 602 is brought into contact with the uppermost original, the pickup roller 602 and the feed roller 603 rotate in the clockwise (CW) direction of FIG. 6 to start the conveyance of the originals.

The pickup roller 602 and the feed roller 603 feed the originals 101 one by one by a frictional separation method. For example, the second and subsequent originals which are about to be fed by the pickup roller 602 together with the uppermost original are restricted by a friction piece so as to stay on the original stacker 601. The originals conveyed one by one are detected by a separation sensor (not shown) provided downstream of the feed roller 603 in the conveying direction of the originals. The feed roller 603 conveys the originals 101 that have been conveyed by the pickup roller 602 to the registration roller pair 604.

The registration roller pair 604 is stopped at the time when a tip end of the original 101 reaches the registration roller pair 604. Even after the tip end of the original 101 collides with the registration roller pair 604, the feed roller 603 continues the conveyance of the originals 101. In this manner, the original 101 forms a loop. With the formation of the loop, skew feeding in the conveying direction of the original 101 is corrected. The registration roller pair 604 starts to rotate after the skew feeding is corrected, and conveys the originals 101 to the original conveyor 615.

The original conveyor 615 includes a conveyor belt 605, a drive roller 606, a driven roller 607, and a plurality of pressing rollers 616. The original conveyor 615 conveys the original 101 with the use of the conveyor belt 605. The conveyor belt 605 is tensioned around the drive roller 606 and the driven roller 607. Moreover, the conveyor belt 605 is pressed against the platen 102 by the pressing rollers 616. The conveyor belt 605 conveys, by frictional force, the original 101 that enters between the conveyor belt 605 and the platen 102. Thus, the original 101 is conveyed on the platen 102.

When the original 101 reaches a predetermined position on the platen 102, the conveyor belt 605 is stopped. The image of the original 101 is read by the document scanner 215 under a stopped state. After the image is read, the conveyor belt 605 conveys the original 101 to the original reversing unit 608. When there is a subsequent original, the subsequent original is conveyed to the predetermined position by the conveyor belt 605 and stopped thereat similarly to the preceding original, and an image thereof is read. While the subsequent original is read, the original reversing unit 608 reverses the front and the back of the preceding original and discharges the preceding original to the discharge tray 617.

The original reversing unit 608 includes a reverse roller 609, a conveyor roller pair 610, a reverse flapper 611, a discharge flapper 613, and a reverse roller 612. The reverse roller 609 and the conveyor roller pair 610 are driven by a drive motor (not shown). This drive motor can perform forward and reverse rotation. With the use of a drive motor different from that of the original conveyor 615, the original reversing unit 608 can operate independently of the original conveyor 615.

The original 101 conveyed by the conveyor belt 605 of the original conveyor 615 is lifted up by the reverse flapper 611 when entering the original reversing unit 608, and is conveyed to the reverse roller 609. The reverse flapper 611 regulates the entry of the original in the vicinity of an original entrance of the original reversing unit 608, and is controlled by a solenoid (not shown) to take a posture illustrated in FIG. 6, to thereby lift up the original. The original 101 is sandwiched between the reverse roller 609 that rotates in a counterclockwise (CCW) direction, and the reverse roller 612 that faces the reverse roller 609, and is conveyed to the conveyor roller pair 610. When a rear end of the original 101 passes through the discharge flapper 613, the discharge flapper 613 rotates in the CW direction. Moreover, the reverse roller 609 also rotates in the CW direction. Thus, the original 101 is conveyed in a switchback manner, and is discharged to the discharge tray 617 of a discharged sheet stacking portion.

<Calibration Operation>

In this embodiment, a description is given of a case in which, in the image forming apparatus 100 capable of operating in the first reading mode (ADF reading) and the second reading mode (platen reading) at the time of calibration, the ADF reading is set as a default setting. After outputting a test chart obtained by forming a test pattern on a sheet when executing the calibration, the image forming apparatus 100 turns on the lamp 156 of the ADF 220. In this manner, the user can recognize the place to set the test chart, and is less confused at the time of processing, thereby reducing the load.

Figure 7:
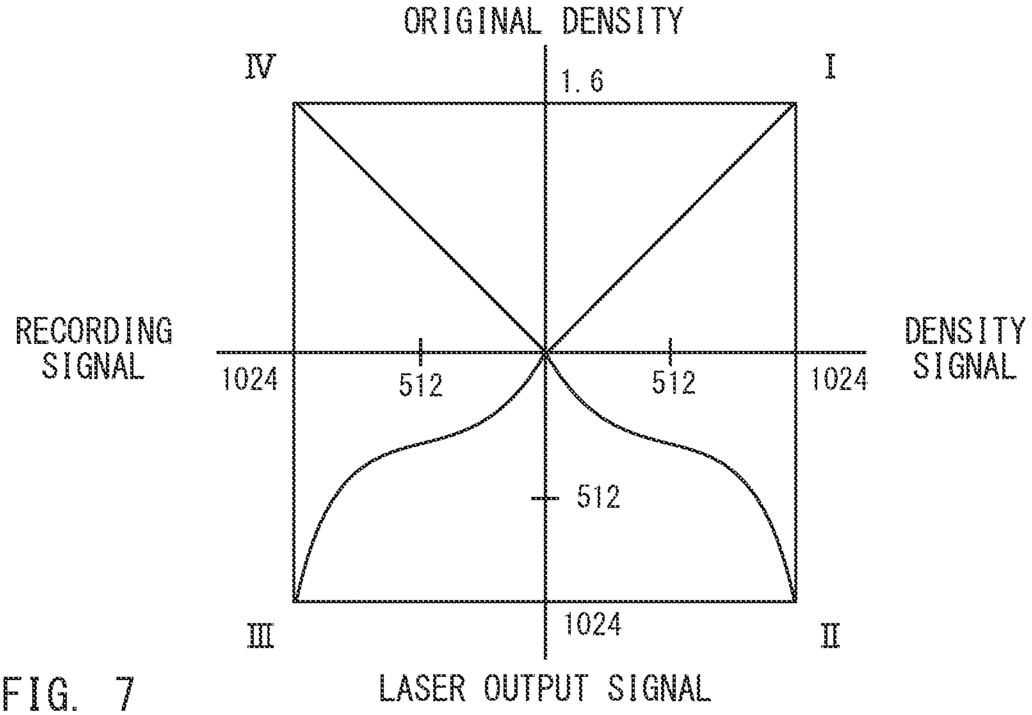
FIG. 7 is a four-quadrant chart.

Calibration for obtaining a desired density and tone characteristic is performed by controlling the LUTa 306 corresponding to a correcting circuit configured to perform y correction. FIG. 7 is a four-quadrant chart for illustrating how the image signal is converted in order to correct the tone characteristic.

Quadrant I represents a reading characteristic of the reader 200. The reading characteristic of the reader 200 is a characteristic of converting, by the reader 200, an original density representing the density of the original image formed on the original into a density signal. The characteristic of converting the original density into the density signal may vary depending on the reading mode (ADF reading or platen reading). Quadrant II represents a conversion characteristic of the tone controller 311 (LUTa 306). The conversion characteristic of the tone controller 311 is a characteristic of converting, by the LUTa 306, the density signal into a laser output signal representing the amount of light of the laser beam to be output from the semiconductor laser 310. Quadrant III represents a recording characteristic of the printer 300. The recording characteristic of the printer 300 is a characteristic of converting, by the printer 300, the laser output signal into an output density representing the density of the image to be formed on the sheet. Quadrant IV represents a relationship between the original density and a recorded density of the image formed on the sheet. This relationship represents a tone reproducing characteristic of the entire image forming apparatus 100.

The printer 300 in this embodiment corrects a non-linear part of the recording characteristic of the printer 300 in Quadrant III by the conversion characteristic of the tone controller 311 in Quadrant II in order to obtain a linear tone characteristic in Quadrant IV. The LUTa 306 is created by exchanging the input and the output of the characteristic of Quadrant III obtained in a case where the test chart is created without performing the processing by the tone controller 311. In this embodiment, the output number of tones is 256 (8 bits), but the number of tones in the tone controller 311 is 1,024 because the tone controller 311 processes 10-bit digital signals.

<Tone Correction>

Tone correction is executed when reproducibility of the density or hue of an image formed by the printer 300 drops. To execute the tone correction, a test chart for tone correction, which is formed by the printer 300, is read with the reader 200 and an LUTa for correcting the density characteristic (y characteristic) is created based on the result of the reading.

Figure 8:
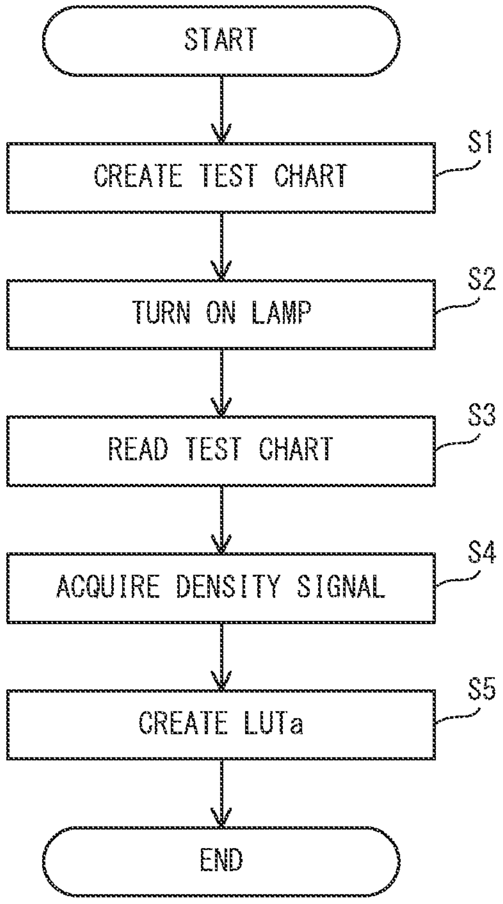
FIG. 8 is a flow chart for illustrating tone correction processing.
Figure 9:
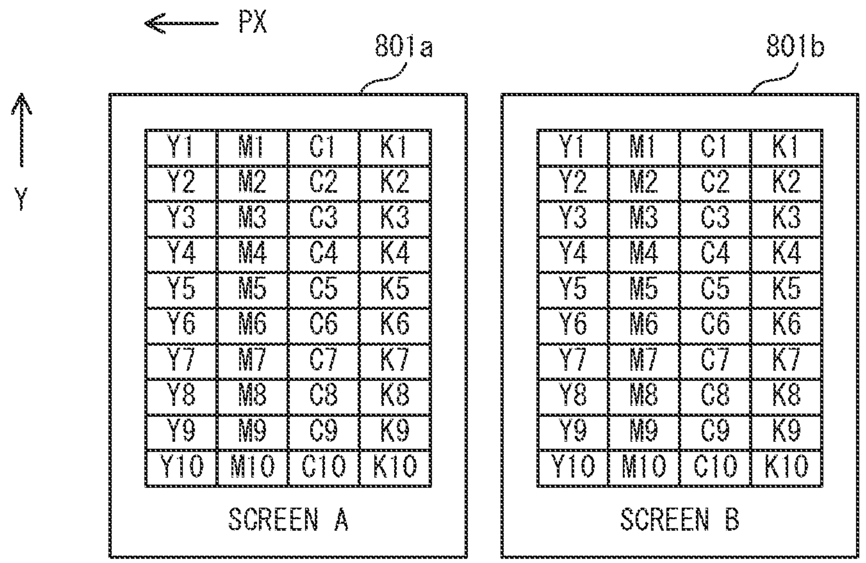
FIG. 9 is an exemplary view of test charts.
Figure 10A:
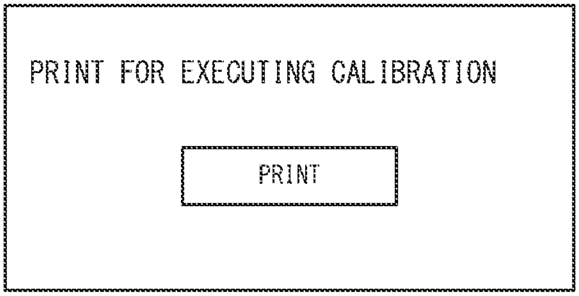
FIG. 10A and FIG. 10B are exemplary views of screens to be displayed on a display.
Figure 10B:
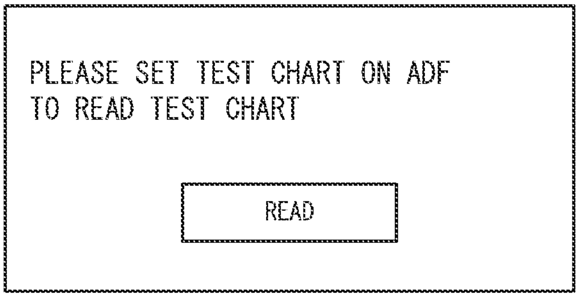

FIG. 8 is a flow chart for illustrating the tone correction processing. FIG. 9 is an exemplary view of test charts to be used in the tone correction. FIG. 10A and FIG. 10B are exemplary views of screens to be displayed on a display of the operating unit 400 during the tone correction processing.

The CPU 301 causes the printer 300 to create a test chart for tone correction exemplified in FIG. 9 (Step S1). Sheets having a predetermined size are stored in advance in a sheet feeding cassette of the printer 300. The CPU 301 displays a guide screen exemplified in FIG. 10A on the display of the operating unit 400. On the guide screen, a message of "PRINT FOR EXECUTING CALIBRATION" and a "PRINT" button for giving an instruction to create the test chart are displayed. When the "PRINT" button is pressed through the operating unit 400, the CPU 301 transmits the density signals of the image signals (test patter) for creating the test chart to the color processor 303. The density signals processed by the color processor 303 are transmitted to the dither processing portion 307 via the tone controller 311. At this time, the LUTa 306 is not used. That is, the density signals of YMCK output from the UCR unit 305 bypass the LUTa 306 to be input to the dither processing portion 307. In this manner, a test pattern corresponding to the density signals of YMCK bypassing the LUTa 306 is printed on a sheet, and thus the test chart is created.

As illustrated in FIG. 9, each of test charts 801*a* and 801*b* includes test patterns having 10 tones for each color of Y, M, C, and K. For each color, for example, test patterns having 10 tones are formed of density signals of 10%, 20%, 30%, 40%, 50%, 60%, 70%, 80%, 90%, and 100%. The dither processing portion 307 can apply a plurality of procedures of halftone processing. For example, the dither processing portion 307 includes a small number-of-lines screen (160 lines per inch (lpi) to 180 lpi) and a large number-of-lines screen (250 lpi to 300 lpi). The test chart 801*a* is a test chart to which the small number-of-lines screen is applied. The test chart 801*b* is a test chart to which the large number-of-lines screen is applied. Tone images may be formed by the small number-of-lines screen, and letters or other line images may be formed by the large number-of-lines screen. When the tone characteristic greatly varies due to the difference in number of screen lines, it is more preferred to set the tone levels depending on the number of screen lines. In a case where the printer 300 has ability to form an image with three types or more of the number of lines, the number of types of test charts may be three or more. In this case, the number of test charts created at the time of tone correction is defined to be one for the sake of convenience.

After creating the test chart, the CPU 301 turns on the lamp of the apparatus on the side on which the test chart is to be set (Step S2). In this embodiment, the ADF reading is set as a default setting, and hence the CPU 301 turns on the lamp 156 of the ADF 220. In the case of the platen reading, the CPU 301 turns on the lamp 157 of the document scanner 215. The CPU 301 turns on the lamp to instruct the user on the apparatus to set the test chart. The user sets the test chart to the specified apparatus (place).

In a case where the ADF 220 does not include the lamp 156, the CPU 301 may turn on the original indicator 503 to instruct the user on the apparatus to set the test chart. Further, in addition to the lighting of the lamp 156 or 157, the CPU 301 may instruct the user on the apparatus to set the test chart by sound. As a matter of course, the lighting of the lamp 156 or 157 and the sound may be used in combination.

The lamp 156 or 157 may be set to have a specific blinking pattern at the time of calibration, such as continuous lighting, blinking, or lighting in a pattern different from that in a normal case. The color of the lamp 156 or 157 may be different between the case of calibration and the normal case. For example, in a case where the original is placed on the original tray 501 in a copy mode of copying the original, the lamp 156 is turned on when the sensor 504 detects that the original is placed on the original tray 501. Meanwhile, at the time of calibration, the lamp 156 is turned on before the sensor 504 detects that the test chart is placed on the original tray 501. Further, the light intensity of the lamp 156 or 157 may be increased to raise the awareness of the user.

After instructing the user on the place to set the test chart, the CPU 301 reads the test chart by the reader 200 (Step S3). The CPU 301 displays an input screen for inputting an instruction to read the test chart on the display of the operating unit 400 after instructing the user on the place to set the test chart. FIG. 10B exemplifies such an input screen. On the input screen, a message of "PLEASE SET TEST CHART ON ADF TO READ TEST CHART" and a "READ" button for giving a reading instruction are displayed. In a case where the "READ" button is pressed through the operating unit 400, the CPU 301 starts the conveyance of the test chart by the ADF 220, to thereby read the test chart by the document scanner 215.

The CPU 301 acquires the density signals of the test pattern based on the reading result (luminance signals) (Step S4). The CPU 301 converts the luminance signals into the density signals with the use of the LUTid 304 of the color processor 303. Thus, a density signal for each of the images of 10 tones is obtained.

The CPU 301 creates the LUTa based on the density signals used to create the test pattern and the density signals obtained from the reading result of the test chart (Step S5). The CPU 301 stores the created LUTa in the memory 302. At this stage, the CPU 301 can obtain the recording characteristic of the printer 300 represented in Quadrant III of FIG. 7. The CPU 301 exchanges the input and the output of the recording characteristic to determine the LUTa of the printer 300, and sets the LUTa to the tone controller 311. Data is insufficient to obtain the LUTa through calculation. The reason is because the test pattern is only provided for 10 tones although 256 tones are usually required. Accordingly, the CPU 301 interpolates the insufficient data to create required data. With such calibration, a tone characteristic that is linear with respect to the target density can be achieved. In the manner described above, the tone correction processing is performed.

In this embodiment described above, in the image forming apparatus 100 capable of performing ADF reading and platen reading, the user is instructed on the place to set the test chart. In this manner, the user is less confused at the time of setting the test chart on the instructed place, and can perform the operation at the time of calibration without confusion. In this manner, the image forming apparatus 100 is capable of executing the calibration while the work load of the user is reduced.

Modification Example

Figure 11:
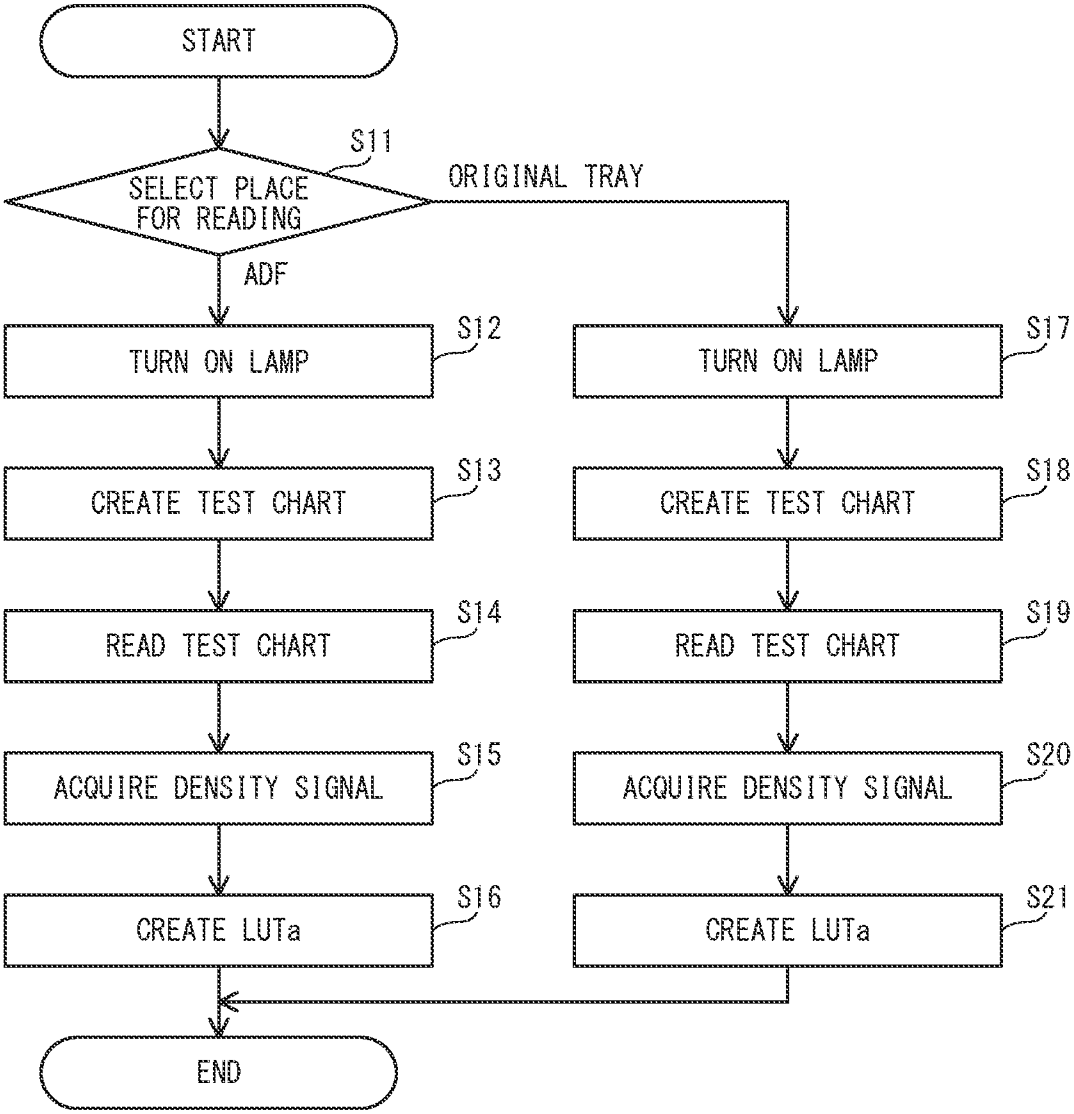
FIG. 11 is a flow chart for illustrating tone correction processing.
Figure 12A:
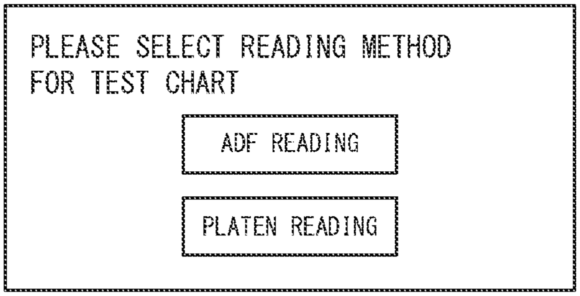
FIG. 12A and FIG. 12B are exemplary views of screens to be displayed on the display.
Figure 12B:
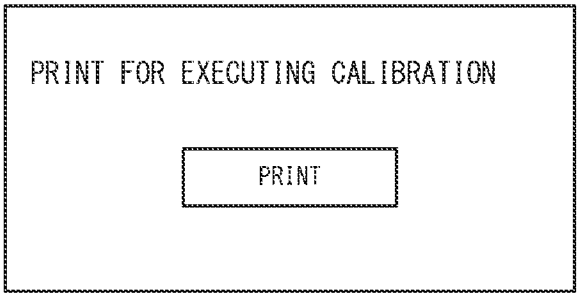

A description is given of a case in which the user can select the reading mode at the time of tone correction between the ADF reading and the platen reading. FIG. 11 is a flow chart for illustrating the tone correction processing in this case. FIG. 12A and FIG. 12B are exemplary views of screens to be displayed on the display of the operating unit 400 during the tone correction processing. In this example, the test chart is created by different test patterns between the ADF reading and the platen reading.

In a case where the tone correction is executed based on the user instruction information, the CPU 301 displays a guide screen illustrated in FIG. 12A on the display of the operating unit 400 in order to allow the user to select the reading method (Step S11). In the guide screen illustrated in FIG. 12A, a message for urging the user to select the reading method, and buttons that allow selection of the ADF reading or the platen reading are displayed. The user selects either one of the ADF reading and the platen reading through this guide screen. The CPU 301 functions as a selector configured to select the reading mode based on the user instruction information input from the operating unit 400.

In a case where the ADF reading is selected (Step S11: ADF), the CPU 301 starts the lighting of the lamp 156 of the ADF 220 (Step S12). Further, the CPU 301 displays a guide screen exemplified in FIG. 12B on the display of the operating unit 400. The guide screen exemplified in FIG. 12B is the same as the guide screen illustrated in FIG. 10A.

Next, in a case where the button for starting printing is pressed by the user through the guide screen of FIG. 12B, the CPU 301 controls the printer 300 in order to print a test pattern for ADF reading on a sheet (Step S13). In a case where a test chart created with the use of the test pattern for ADF reading is output from the printer 300, the CPU 301 displays a button for starting the reading of the test chart on the display of the operating unit 400. At this time, the lamp 156 is turned on, and hence the user can recognize that the test chart is required to be placed on the original tray 501 of the ADF 220. Further, a guidance for urging the user to place the test chart on the original tray 501 of the ADF 220 may be displayed on the display of the operating unit 400.

In a case where the button for starting the reading is pressed by the user, the CPU 301 controls the ADF 220 to convey the test chart placed on the original tray 501 to the reading position, to thereby read the test chart (Step S14). In this case, after the button for starting the reading is pressed by the user, the CPU 301 turns off the lamp 156 of the ADF 220. Then, the CPU 301 acquires the density signals of the test pattern based on the reading result (luminance signals) (Step S15). The CPU 301 converts the acquired luminance signals into density signals based on the LUTid 304 of the color processor 303. In this manner, the density signals can be obtained for the respective 10-tone images. The CPU 301 creates the LUTa based on the density signals used to generate the test pattern and on the density signals obtained from the reading result of the test chart (Step S16), and ends the tone correction processing.

In a case where the platen reading is selected in the processing of Step S11 (Step S11: platen), the CPU 301 starts the lighting of the lamp 157 of the document scanner 215 (Step S17). Further, the CPU 301 displays the guide screen exemplified in FIG. 12B on the display of the operating unit 400. The guide screen exemplified in FIG. 12B is the same as the guide screen illustrated in FIG. 10A.

Next, in a case where the button for starting printing is pressed by the user through the guide screen of FIG. 12B, the CPU 301 controls the printer 300 in order to print a test pattern for platen reading on a sheet (Step S18). In a case where a test chart created with the use of the test pattern for platen reading is output from the printer 300, the CPU 301 displays a button for starting the reading of the test chart on the display of the operating unit 400. At this time, the lamp 157 is turned on, and hence the user can recognize that the test chart is to be placed on the platen 102. Further, a guidance for urging the user to place the test chart on the platen 102 may be displayed on the display of the operating unit 400.

In a case where the button for starting the reading is pressed by the user, the CPU 301 reads the test chart on the platen 102 (Step S19). In this case, after the button for starting the reading is pressed by the user, the CPU 301 turns off the lamp 157 of the document scanner 215. Then, the CPU 301 acquires the density signals of the test pattern based on the reading result (luminance signals) (Step S20). The CPU 301 converts the acquired luminance signals into density signals based on the LUTid 304 of the color processor 303. In this manner, the density signals can be obtained for the respective 10-tone images. The CPU 301 creates the LUTa based on the density signals used to generate the test pattern and on the density signals obtained from the reading result of the test chart (Step S21), and ends the tone correction processing.

The timing to start the lighting of the lamp 156 is not limited to when the ADF reading is selected by the user, and may be, for example, before the test chart is placed on the original tray 501. Similarly, the timing to start the lighting of the lamp 157 is not limited to when the platen reading is selected by the user, and may be, for example, before the test chart is placed on the platen 102. Further, the lighting of the lamp 156 and the lamp 157 may be continued until, for example, the LUTa is created.

In a case where the ADF 220 does not include the lamp 156, the CPU 301 may turn on the original indicator 503 to instruct the user on the apparatus to set the test chart. In a case where the document scanner 215 does not include the lamp 157, the CPU 301 may turn on the light source 103 to instruct the user on the apparatus to set the test chart.

Further, in addition to the lighting of the lamp 156 or 157, the CPU 301 may instruct the user on the apparatus to set the test chart by sound. In this case, a name of the set apparatus and an instruction, such as "Please set to platen" or "Please set to ADF," are output by voice. As a matter of course, the lighting of the lamp 156 or 157 and the sound may be used in combination.

The lamp 156 or 157 may be set to have a specific blinking pattern at the time of calibration, such as continuous lighting, blinking, or lighting in a pattern different from that in a normal case. The color of the lamp 156 or 157 may be different between the case of calibration and the normal case. Further, the light intensity of the lamp 156 or 157 may be increased to raise the awareness of the user.

In this embodiment described above, in the image forming apparatus 100 capable of performing ADF reading and platen reading, the user is allowed to select the reading mode between the ADF reading and the platen reading. The image forming apparatus 100 instructs the user on the place to set the test chart in accordance with the selection by the user so that the user is less confused at the time of setting the test chart on the instructed place, and can perform the operation at the time of calibration without confusion. In this manner, the image forming apparatus 100 is capable of executing the calibration while the work load of the user is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049103, filed Mar. 19, 2020, which is hereby incorporated by reference herein in its entirety.

What is claimed is:

1. An image forming apparatus, comprising:

a platen on which an original is to be placed;
a feeder configured to feed an original placed on a tray;
a sensor configured to detect a sheet on the tray;
a lamp provided for the feeder;
a reader configured to read the original placed on the platen and to read the original fed by the feeder;
an image forming unit configured to form an image on a sheet; and
a controller configured to:
  control the image forming unit to form a first test image on a sheet;
  control the reader to read the first test image formed on the sheet placed on the platen;
  control a density of the image to be formed by the image forming unit based on a reading result of the first test image;
  control the image forming unit to form a second test image on a sheet;
  control the reader to read the second test image formed on the sheet fed by the feeder; and
  control the density of the image to be formed by the image forming unit based on a reading result of the second test image,
wherein the controller is configured to drive, in a case in which the second test image is formed by the image forming unit in order to control the density, the lamp before the sheet on which the second test image is formed is detected by the sensor,
wherein the reader includes a reader lamp, which is different from the lamp, and
wherein the controller is configured to drive, in a case in which the first test image is formed by the image forming unit in order to control the density, the reader lamp before the sheet on which the first test image is formed is placed on the platen.

2. The image forming apparatus according to claim 1, wherein the lamp is an indicator to be driven based on a detection result obtained by the sensor.

3. The image forming apparatus according to claim 1, wherein the controller is configured to control the lamp to emit light in a case in which the second test image is formed by the image forming unit in order to control the density.

4. The image forming apparatus according to claim 1, wherein the controller is configured to control the lamp to blink in a case in which the second test image is formed by the image forming unit in order to control the density.

5. The image forming apparatus according to claim 1, wherein the controller is configured to drive the lamp after receiving user instruction information for an instruction to form the second test image.

6. The image forming apparatus according to claim 1, further comprising a display configured to display information, wherein the controller is configured to cause the display to display a screen which allows selection between a first reading operation in which the reader reads a test image formed on a sheet placed on the platen without using the feeder, and a second reading operation in which the reader reads a test image formed on a sheet fed by the feeder, and
wherein the controller is configured to drive the lamp after the second reading operation is selected through the screen.

7. The image forming apparatus according to claim 6, wherein the controller is configured to avoid driving the lamp in a case where in which the first reading operation is selected through the screen.

8. The image forming apparatus according to claim 1,
wherein the first test image includes first images having different tones, and
wherein the second test image includes second images having different tones.

9. The image forming apparatus according to claim 1,
wherein the controller includes a tone control unit configured to convert an image signal based on a conversion condition,
wherein the image forming unit is configured to form the image based on the converted image signal, wherein the controller is configured to generate, in a case in which the first test image is read by the reader, the conversion condition based on the reading result of the first test image, and wherein the controller is configured to generate, in a case in which the second test image is read by the reader, the conversion condition based on the reading result of the second test image.

10. An image forming apparatus comprising:

a platen on which an original is to be placed;

a feeder configured to feed an original placed on a tray;

a sensor configured to detect a sheet on the tray;

a lamp provided for the feeder;

a reader configured to read the original placed on the platen and to read the original fed by the feeder;

an image forming unit configured to form an image on a sheet; and a controller configured to:

control the image forming unit to form a first test image on a sheet;

control the reader to read the first test image formed on the sheet placed on the platen;

control a density of the image to be formed by the image forming unit based on a reading result of the first test image;

control the image forming unit to form a second test image on a sheet;

control the reader to read the second test image formed on the sheet fed by the feeder; and control the density of the image to be formed by the image forming unit based on a reading result of the second test image, wherein the controller is configured to drive, in a case in which the original is placed on the tray in order for the image forming unit to copy the original, the lamp based on a detection result obtained by the sensor, and wherein the controller is configured to drive, in a case in which the sheet having the second test image formed thereon is placed on the tray in order to control the density, the lamp before the sheet is detected by the sensor.

11. The image forming apparatus according to claim 10, wherein the lamp is an indicator to be driven based on the detection result obtained by the sensor.

12. The image forming apparatus according to claim 10, wherein the controller is configured to control the lamp to emit light in a case in which the second test image is formed by the image forming unit in order to control the density.

13. The image forming apparatus according to claim 10, wherein the controller is configured to control the lamp to blink in a case in which the second test image is formed by the image forming unit in order to control the density.

14. The image forming apparatus according to claim 10, wherein the controller is configured to drive the lamp after receiving user instruction information for an instruction to form the second test image.

15. The image forming apparatus according to claim 10, further comprising a display configured to display information, wherein the controller is configured to cause the display to display a screen which allows selection between a first reading operation in which the reader reads a test image formed on a sheet placed on the platen without using the feeder, and a second reading operation in which the reader reads a test image formed on a sheet fed by the feeder, and wherein the controller is configured to drive the lamp after the second reading operation is selected through the screen.

16. The image forming apparatus according to claim 15, wherein the controller is configured to avoid driving the lamp in a case in which the first reading operation is selected through the screen.

17. The image forming apparatus according to claim 10, wherein the reader includes a reader lamp different from the lamp, and wherein the controller is configured to drive, in a case in which the first test image is formed by the image forming unit in order to control the density, the reader lamp before the sheet having the first test image formed thereon is placed on the platen.

18. The image forming apparatus according to claim 10, wherein the first test image includes first images having different tones, and wherein the second test image includes second images having different tones.

19. The image forming apparatus according to claim 10, wherein the controller includes a tone control unit configured to convert an image signal based on a conversion condition, wherein the image forming unit is configured to form the image based on the converted image signal, wherein the controller is configured to generate, in a case in which the first test image is read by the reader, the conversion condition based on the reading result of the first test image, and wherein the controller is configured to generate, in a case in which the second test image is read by the reader, the conversion condition based on the reading result of the second test image.

* * * * *